June 30, 1953  P. C. SYMMONS  2,643,675

DUPLEX VALVE

Filed June 5, 1951

INVENTOR.
Paul C. Symmons.
BY Louis C. Smith
Attorney.

Patented June 30, 1953

2,643,675

UNITED STATES PATENT OFFICE 2,643,675

DUPLEX VALVE

Paul C. Symmons, Boston, Mass.

Application June 5, 1951, Serial No. 229,997

3 Claims. (Cl. 137—630.18)

This invention relates to a valve structure of the type which has two separate inlet openings, two separate discharge openings, one for each inlet opening, a valve controlling communication between each inlet opening and its discharge opening, and means common to both valves for operating them simultaneously.

One object of the invention is to provide a valve of this type which is so constructed that when the valve operating member is actuated to close the valves, said member will automatically center itself so as to effect a tight closure of both valves even though one of the valves has become more or less worn.

Other objects of the invention are to improve valves of this type in various particulars which will be pointed out in the following description.

In the drawings wherein I have illustrated a selected embodiment of the invention:

Figure 1:
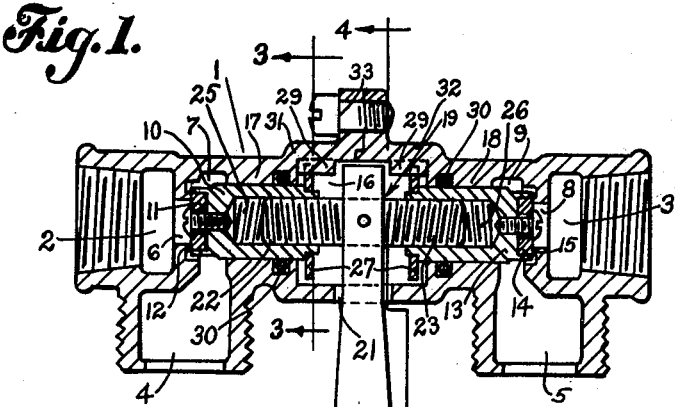
Fig. 1 is a sectional view of a valve embodying the invention taken substantially on the line 1—1, Fig. 4, and showing both valves closed.

The valve structure herein shown comprises a valve casing 1 which is provided with two separate inlet openings 2 and 3, and also with two discharge openings 4 and 5. The inlet opening 2 communicates through a port 6 with a valve chamber 7 with which the discharge opening 4 communicates, and the inlet opening 3 communicates through a port 8 with a separate valve chamber 9 with which the discharge port 5 communicates.

The port 6 is controlled by valve 10 that is provided with the usual valve washer 11 which seats against the valve seat 12. The port 8 is controlled by a similar valve 13 having a valve washer 14 which is adapted to seat against the valve seat 15.

The valve casing is provided with a central chamber 16 which is separated from the valve chamber 7 by a partition 17 and which is also separated from the valve chamber 9 by another partition 18. The body portion of the valve 10 extends through the partition 17 into the chamber 16, and the body portion of the valve 13 extends through the partition 18 into chamber 16.

The valves 10 and 13 are axially alined and are oppositely disposed, the valve 10 being closed against its valve seat 12 by a movement to the left, as in Fig. 1, and the valve 13 being closed against its valve seat 15 by a movement to the right.

Both valves 10 and 13 are controlled by a valve-operating member indicated generally at 19 and which is situated within the chamber 16, said valve member having an operating handle 20 which extends through a slot 21 with which the valve casing 1 is provided.

Said valve-operating member 19 is provided with means which cooperates with both valves in such a way that when the member 19 is turned in one direction both valves will be opened simultaneously, and when turned in the opposite direction both valves will be closed.

As herein shown, the valve-operating member has two oppositely disposed axially alined exteriorly screw threaded portions 22 and 23 which cooperate with the valves 10 and 13 to open and close them as the valve-operating member is turned. The screw threads on the portion 22 are right hand screw threads and engage mating interior screw threads formed in the walls of a recess 25 with which the valve 10 is provided. The screw threaded portion 23 has left hand screw threads which engage mating interior screw threads formed in the walls of a recess 26 with which the valve 13 is provided.

The valves 10 and 13 are free to move toward and from their seats but are held from rotative movement so that the turning of the valve-operating member 19 will operate to open or close the valves simultaneously depending on the direction in which the said member is turned.

The means for holding the valves from rotative movement consists of a collar 27 which is welded to or otherwise rigidly secured to the valve and which is provided in its periphery with a notch 28 that receives a rib 29 formed on the valve casing and located within the chamber 16.

Figure 2:
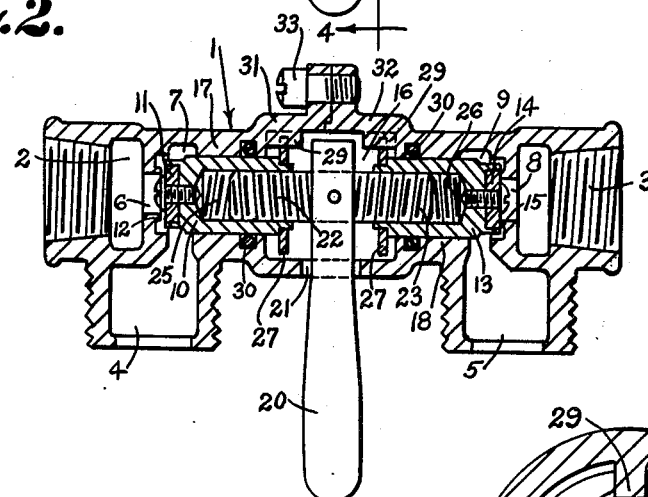
Fig. 2 is a view similar to Fig. 1 but showing the manner in which the valve-operating member adjusts itself to effect a tight closure of both valves.

In order to provide a tight closing of both valves even though one valve or its valve seat may become worn more or less, the slot 21 in the valve casing and through which the handle 20 extends is made somewhat wider than the thickness of the handle, as shown in Figs. 1 and 2.

Figure 4:
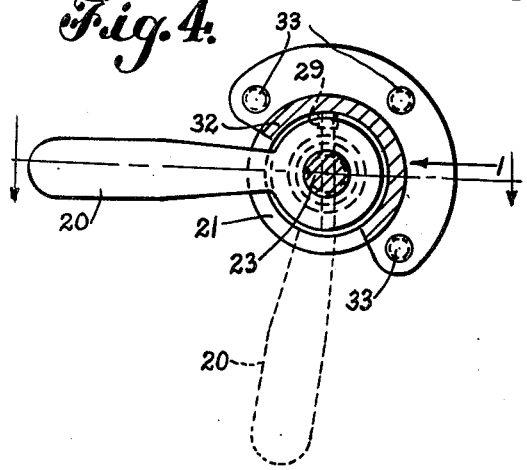
Fig. 4 is a section on the line 4—4, Fig 1.
Figure 3:
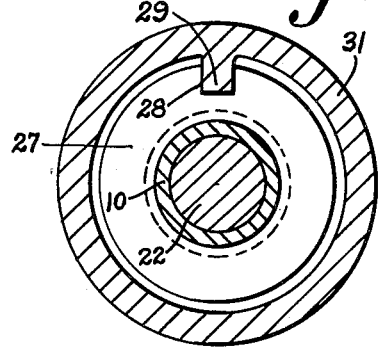
Fig. 3 is an enlarged section on the line 3—3, Fig. 1.

If during the closing movement of the valves resulting from swinging the handle downwardly from the full to the dotted lines position, Fig. 4, the valve 13 engages its seat while the valve 10 is still separated from its seat, continued turning movement of the handle will cause the valve operating member 19 to move bodily toward the left because of the screw threaded engagement between the portion 23 and the valve 13 which is held from movement by its engagement with its valve seat. This bodily movement to the left of the valve operating member together with the movement which is given to the valve 10 by the continued turning movement of the valve operating member will bring said valve 10 tightly against its seat, and thus both valves will be seated with the same valve seating pressure.

30 indicates suitable packing in each of the partitions 17 and 18 to prevent leakage from either inlet port into the central chamber 16.

The valve casing can conveniently be made in two sections 31 and 32 which are secured together by screws 33.

I claim:

1. A valve structure comprising a valve casing provided with two separate inlet openings and a separate discharge opening communicating with each inlet opening through a separate port, two separate axially alined oppositely disposed valves, one controlling the port connecting one inlet opening and its discharge opening and the other controlling the other port connecting the other inlet opening and its discharge opening, both valves being movable in the direction of their common axis to open and close the ports, a valve operating member situated between said valves and mounted for turning movement about the common axis of the valves, said valve operating member having means cooperating with both valves by which turning movement of said member in one direction will move the valves away from each other in the direction of their common axis to close both valves and turning movement in the opposite direction will move the valves in an opposite axial direction to open both valves, said valve operating member being free to move longitudinally of the common valve axis, whereby when the valves are closed both valves will be subjected to the same valve-closing pressure.

2. A valve structure comprising a valve casing provided with two separate inlet openings and a separate discharge opening communicating with each inlet opening, two separate axially alined oppositely disposed valves, one controlling the communications between one inlet opening and its discharge opening and the other controlling the communication between the other inlet opening and its discharge opening, a valve operating member situated between said valves and mounted for turning movement about the common axis of the valves, said valve operating member having a right hand screw threaded connection with one valve and a left hand screw threaded connection with the other, whereby turning movement of the valve operating member in one direction opens both valves and turning movement in the other direction closes both valves, said valve operating member being free to move longitudinally of the common valve axis, whereby during the closing movement of the valves both valves will be subjected to the same valve-closing pressure.

3. A valve structure as defined in claim 2 in which means are provided to restrain said valves from turning movement while permitting them to move in an axial direction into opening or closing positions.

PAUL C. SYMMONS.

References Cited in the file of this patent

UNITED STATES PATENTS

| Number | Name | Date |
|---|---|---|
| 1,521,724 | Sourh | Jan. 6, 1925 |
| 1,565,794 | Clifford | Dec. 15, 1925 |